United States Patent [19]
Ostdiek et al.

[11] 3,960,022
[45] June 1, 1976

[54] NULL ADJUSTABLE VORTEX RATE SENSOR

[75] Inventors: Arthur J. Ostdiek, Wheaton; Lyndon S. Cox, Silver Spring, both of Md.

[73] Assignee: The United States of America as represented by the Secretary of the Army, Washington, D.C.

[22] Filed: May 9, 1973

[21] Appl. No.: 358,421

[52] U.S. Cl.................................. 73/505; 137/813
[51] Int. Cl.²............................................ G01P 9/00
[58] Field of Search.................. 73/1 D, 1 C, 194 C, 73/505, 1 E, 515; 137/813, 808, 810, 811

[56] References Cited
UNITED STATES PATENTS

| | | | |
|---|---|---|---|
| 3,240,060 | 3/1966 | Doyle | 73/194 C |
| 3,454,023 | 7/1969 | Burke et al. | 137/808 |
| 3,600,930 | 8/1971 | Posingles | 73/1 D |

*Primary Examiner*—Samuel Feinberg
*Attorney, Agent, or Firm*—Nathan Edelberg; Robert P. Gibson; Saul Elbaum

[57] ABSTRACT

A null adjustable vortex rate sensor which enables the precise control and relocation of the stagnation point of the fluid stream with respect to the null line of the pickoff located within said chamber. The null adjustable vortex rate sensor is a vortex rate sensor with a fixed position pickoff and a fixed position drain, a rod being concentrically located in the drain and extended from the drain into the chamber. The horizontal adjustability of this rod inside the drain controls the location of the stagnation point at the pickoff within the chamber very precisely thus enabling one to approximately choose the location of the pickoff member and by means of the rod mechanism located in the drain move and adjust the stagnation point to obtain a null output at the fixed position of the pickoff. The pickoff provides a differential pressure signal which is a function of the angular rate of rotation of the chamber in inertial space.

3 Claims, 7 Drawing Figures

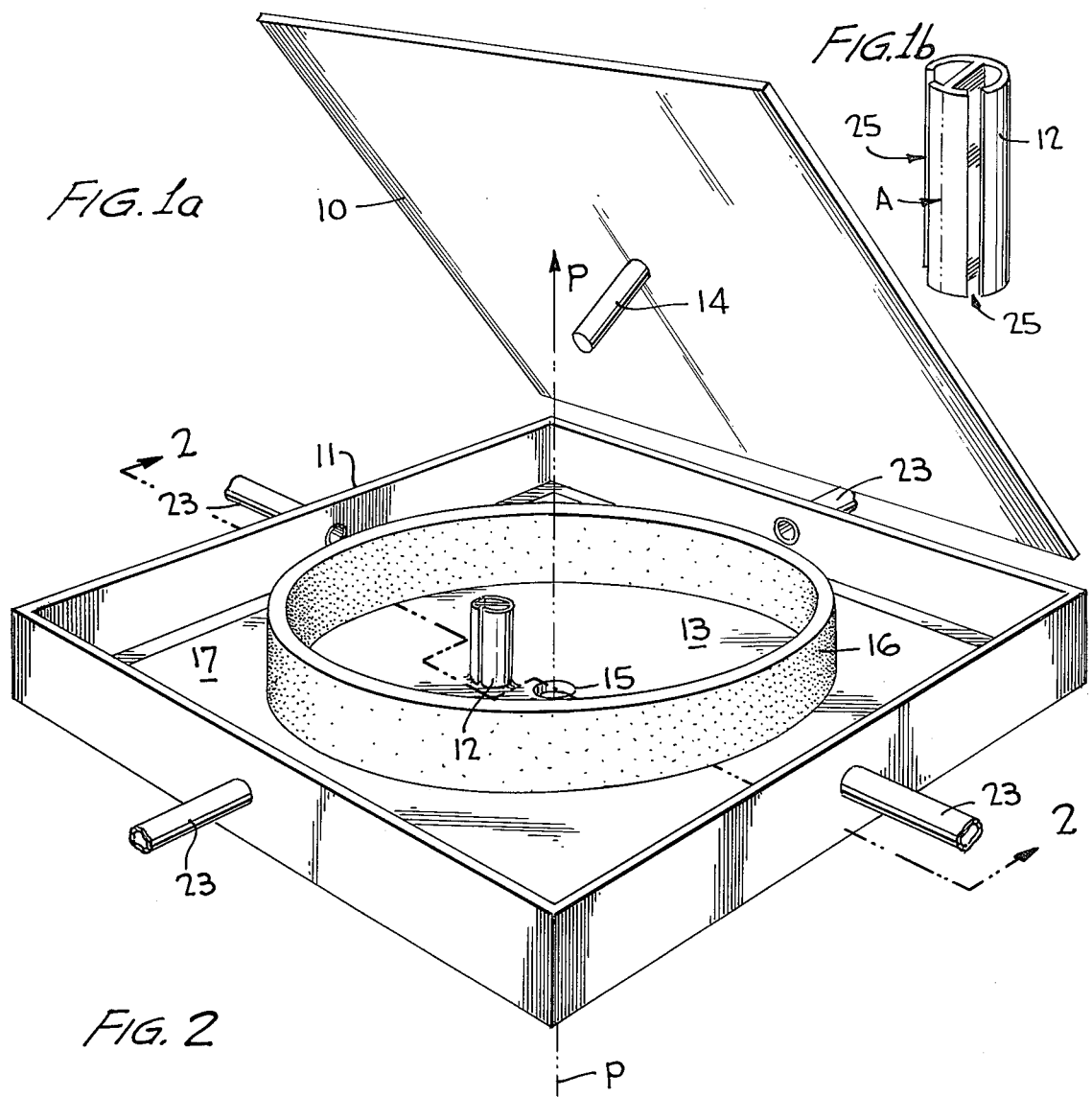
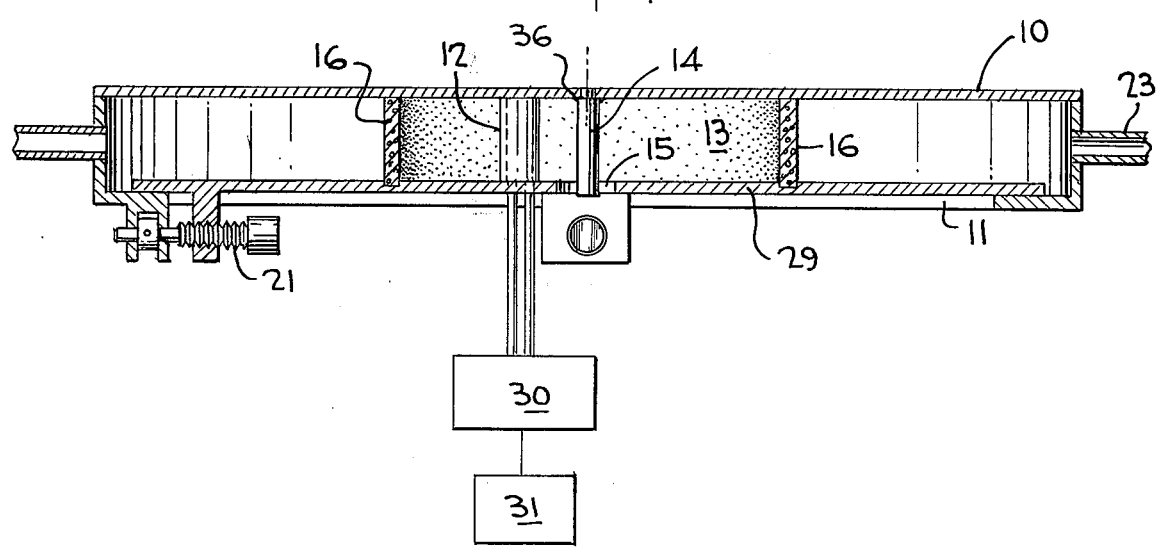

NULL ADJUSTABLE VORTEX RATE SENSOR

RIGHTS OF THE GOVERNMENT

The invention described herein may be manufactured, used, and licensed by or for the United States Government for governmental purposes without the payment to the inventors of any royalty thereon.

BACKGROUND OF THE INVENTION

This invention relates generally to viscous vortex rate sensors and more particularly to such sensors operating using flueric principles. Specifically, the invention relates to a viscous vortex rate sensor having an adjustable null line or stagnation line for the pickoff located therein. On the pickoff in the flow chamber of a vortex rate sensor there exists some line, which when properly coincident with the stagnation point of the fluid stream within the chamber provides stability to the null signal such that it does not fluctuate with changes in power supply. The power supply is a function of the rate and pressure at which fluid is supplied to the chamber. Thus drift due to fluctuation in the power supply can thus be eliminated by moving the pickoff to achieve the desired result. However, the accuracy required of the mechanisms that would have to be used to manufacture, position, and hold the pickoff at the required orientation in the chamber flow field is at least an order of magnitude greater than the state-of-the-art. Therefore, if the vertical null line of the pickoff can be approximately located near the stagnation point instead of having to be mounted as a detached mechanical member, then, in addition, shifts in position due to mechanical instability will be diminished or eliminated.

The significant factor that inhibits the resolution of the streamline angle of present rate sensors is null shift, a d-c shift of the entire curve of output signal versus angular rate during operation, or a lack of repeatability of the curve when the power supply is shut off and then turned on again. Another factor which inhibits resolution of the streamline angle is signal drift due to low frequency noise. The signal drift is related to variations in the power supply level. The pickoff in the typical sensor is of the push-pull variety and therefore has sensing ports on either side of the stagnation point. Therefore a change in the angle of attack generates pressure changes of opposite signs at the two ports, and a differential signal is then a measure of the angle, or a function of the angular rate.

It is not possible to orient the pickoff so that the differential output is perfectly zero when the sensor is stationary. Thus, the differential signal at zero angular rate is not zero and in particular is dependent upon the flow rate. Hence, variations in flow rate inhibit the measurement of small changes of angular rate above zero rate.

The null shift probably results from flexing or shifting in the pickoff drain assembly caused by the pickoff and drain assembly being mounted in the floor of the sensor chamber as a separate structure.

The invention described herein overcomes all of the disadvantages of the foregoing situation.

It is therefore an object of this invention to provide a new and novel viscous vortex rate sensor which has the capability of adjusting the stagnation point within the sensor chamber precisely to a required vertical null line on the pickoff.

It is another object of this invention to provide a new and novel flueric vortex rate sensor which enables the manufacture of such a sensor with an approximately located pickoff wherein the stagnation point may be adjusted to a null line on the pickoff during operation.

It is yet an additional object of this invention to provide a new and novel flueric vortex rate sensor that increases the resolution of the streamline angle.

It is still an additional object of this invention to provide a new and novel flueric vortex rate sensor which enables the adjustment of the null signal from the pickoff.

Still another object of this invention is to provide a new and novel flueric vortex rate sensor which will eliminate the requirement of a mechanism that can position and hold the pickoff at an orientation in the chamber flow field in order to orient the pickoff at the stagnation point for location of the null signal.

These and other objects of the present invention will become more fully apparent with reference to the following specification and drawing which relate to a preferred embodiment of the present invention.

SUMMARY OF THE INVENTION

In accordance with this invention a new and novel vortex rate sensor is provided which enables the adjustment of the stagnation point of the flow field within the sensor chamber such that it may be adjusted to coincide with a desired vertical null line on a differential pressure pickoff within the sensor chamber.

The pickoff is used to obtain a differential pressure signal that is a function of the angular rate at which the sensor is turning in inertial space. The differential pressure signal from the pickoff when the sensor is stationary is called the null signal. The adjustability of stagnation point on the pickoff compensates for null signal changes from flow rate changes so that significant signal offsets generated by such fluctuations do not destroy resolution of the streamline angle of the flow field. The invention eliminates drifts due to power supply fluctuation by moving the stagnation point instead of the pickoff. The invention comprises a solid rod placed in the drain of the sensor chamber. Adjustment of this rod alters the flow field such that the stagnation point on the pickoff is changed. In this fashion the null signal is adjusted by changing the flow field rather than moving the pickoff. The sensitivity of the sensor to movement of the location of the stagnation point on the pickoff by rod movement is significantly less than it is for actual movement of the pickoff. Thus, this adjustable null vortex rate sensor enables the pickoff to be solidly mounted in the chamber and the null adjustment made by rod movement whereby a more precise null is located than otherwise obtainable with a movable pickoff under identical fabrication restrictions.

BRIEF DESCRIPTION OF THE DRAWINGS

The specific nature of the invention as well as other objects, aspects, uses and advantages thereof will clearly appear from the following description and from the accompanying drawing, in which:

FIG. 1a is a perspective view of an adjustable null flueric vortex rate sensor; FIG. 1b is a perspective view of the pickoff; and FIG. 2 is a cross-sectional view of the null adjustable flueric vortex rate sensor showing the details of a particular embodiment of the mechanism for adjusting the flow field within the chamber.

The invention will be understood by first defining the terms "stagnation point" and "vertical null line".

Figure 5A:
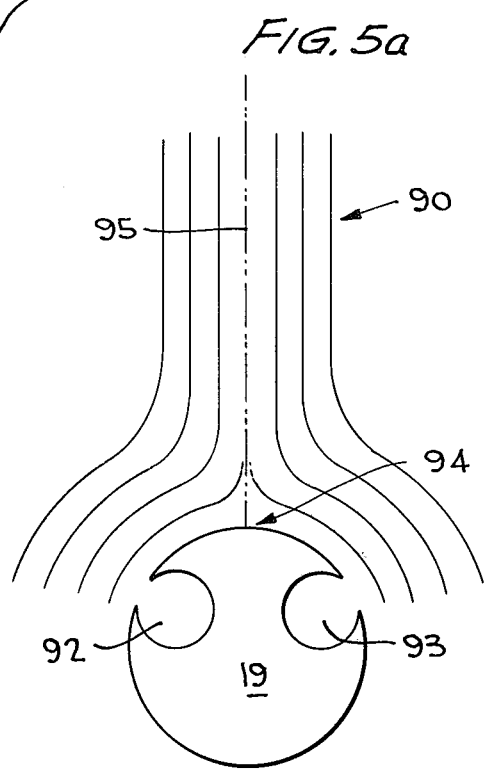
FIG. 5a is an illustration of the flow field around a push-pull sensor.

Referring to FIG. 5a when a fluid stream 90 encounters a stationary object such as body 19 the flow divides itself on each side of the object. When this happens there exists a point 94 on the body 19 which when encountered by a particle of the fluid has a 0.50 probability or a 50% chance of going to either side of the point. This point is the stagnation point of the fluid with respect to the body.

Figure 5B:
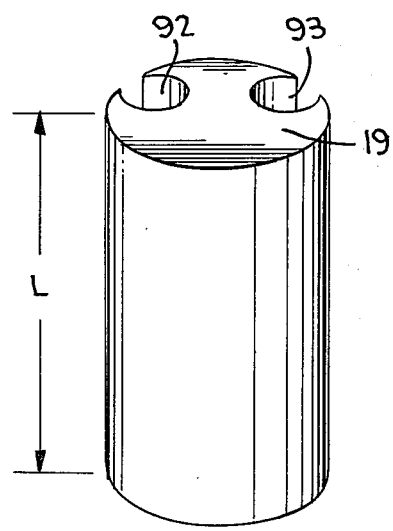
FIG. 5b is an illustration of a typical push-pull sensor.

Now note that the body must be of some finite thickness in the physical world. If this thickness is L, as shown in FIG. 5b, and two slotports 92 and 93 for sensing flow pressure of the fluid are placed parallel to the axis of the body 19 and separated, the stagnation point of the fluid field may be detected by the body 19 for an arbitrarily thin sheet of fluid flow at any place along the length L of the body. Hence, the body 19 has a parallel line of the same length as that of the slot ports on which the coincidence of a stagnation point will give a null differential signal from the two ports 92 and 93. This line is referred to herein as the vertical null line of the sensor or body 19.

The present invention will now be easily understood in its broad aspects by reference to FIG. 1a wherein there is shown a perspective view of the null adjustable flueric vortex rate sensor with the various members therein illustrated. The member 11 is an airtight compartment having a removable lid 10. The airtight compartment 11 is supplied with fluid by means of inlets 23. When lid 10 is sealed upon compartment 11 and fluid issues through inlet 23, plenum 17 supplies fluid to the axissymmetric chamber 13, which is the heart of the sensor. Fluid issues uniformly from plenum 17 through porous shallow cylindrical member 16 into chamber 13 and upon rotation of the flueric vortex rate sensor about the P—P axis a vortex is created within chamber 13. Drain 15 provides an outlet for the fluid supplied to chamber 13. The vortex formed within chamber 13 forms streamlines and the angle of attack sensor 12 measures the angular deviation of the streamlines from the null position.

The pickoff in the typical sensor is of the push-pull variety. It is illustrated in FIG. 1b and has sensing ports 25 on either side of the stagnation point. Thus a change in the angle of attack generates pressure changes of opposite signs at the two vertical ports 25, and a differential signal is sensed by pressure to electrical energy tranducer 30. A standard voltage meter 31 then provides a measure of the angle, or function of the angular rate.

Referring to FIG. 1b, there exists some point A on the pickoff 12 such that when the stagnation point of the flow field within the chamber 13 is located there the null signal from the angle of attack pickoff will not change with fluctuations of power supply.

In the configuration shown in FIG. 2 a solid body 14 attached to lid 10 at point 36 in the shape of a rod is placed in the drain 15. Lateral relative adjustment of the location of the axis of rod 14 in the drain 15 by means of movement of baseplate 29 by micrometer screw mechanism 21 or 28 alters the flow field within said chamber 13. Alteration of the flow field in the chamber 13 adjusts the stagnation point at the pickoff within the chamber. The pickoff 12 is an integral part of the baseplate 29 and is thus solidly soldered thereto. Therefore null adjustment is made either by moving the rod 14 laterally in the chamber 13 or moving base plate 29 a specific distance such that the stagnation point is adjusted to coincide with the vertical null line on the pickoff. Consequently a precise and stable null may be obtained with this adjustment rather than the cumbersome and difficult movement of the pickoff within the chamber relative to the drain.

Figure 3:
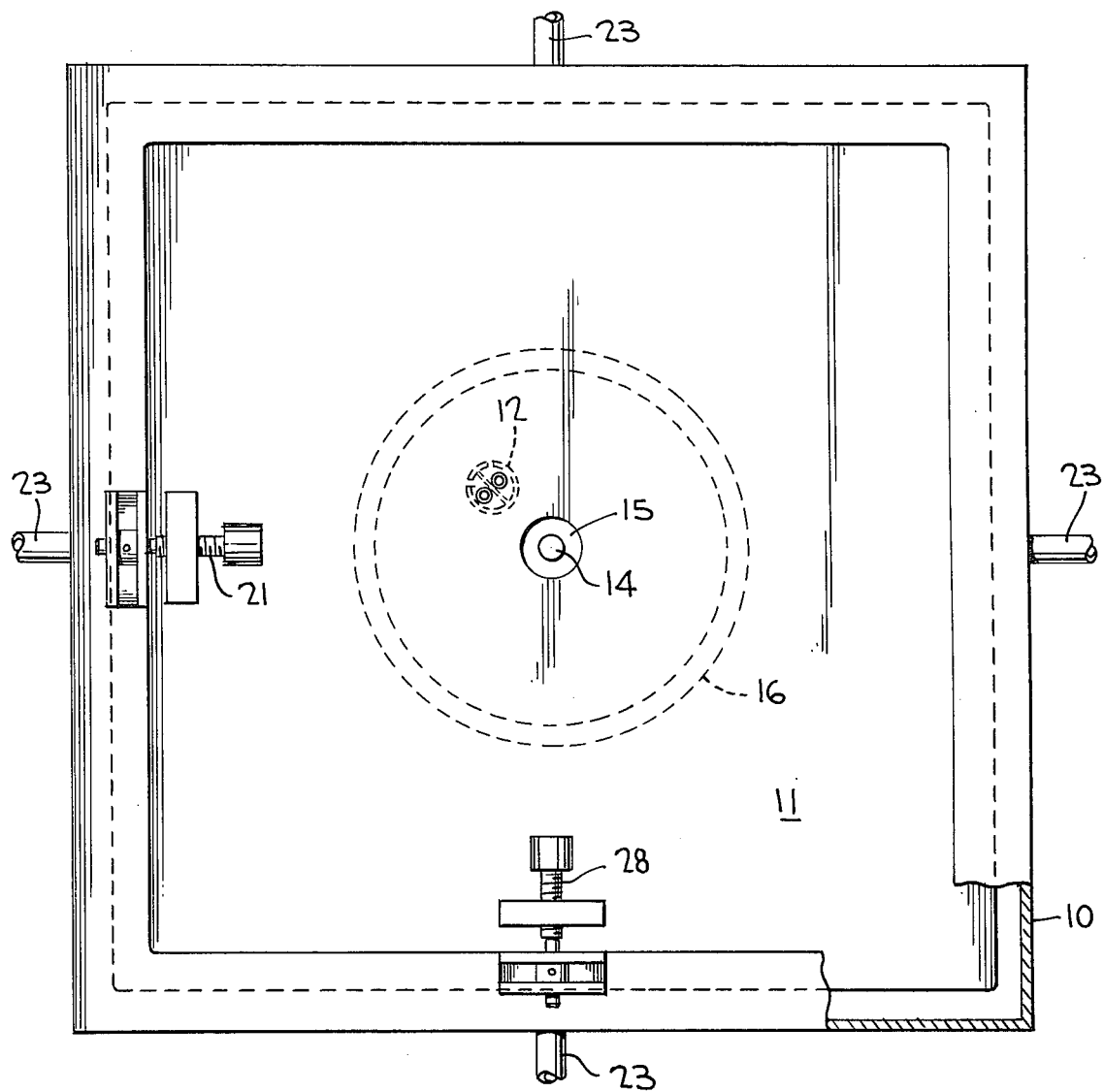
FIG. 3 is a bottom view of the layout of the sensor.
Figure 4:
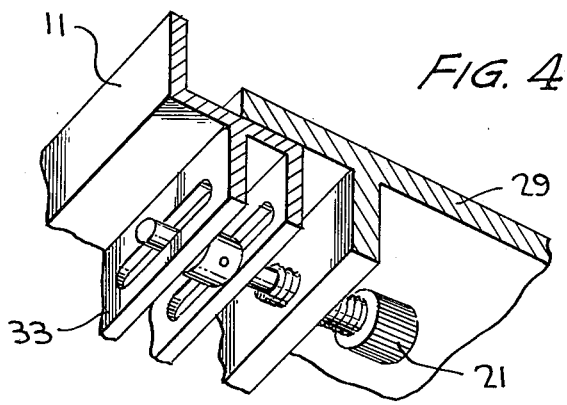
FIG. 4 is a detailed illustration of a micrometer adjustment assembly.

FIGS. 3 and 4 illustrate the mechanism for adjusting baseplate 29 for relative movement of rod 14 inside the drain 15 of the chamber 13. This adjustment is provided by movement of screws of 21 and 28 located at right angles to each other. The screw mechanisms 21 and 28 are attached to the frame 11 by slot member 33 such that one does not impair the movement of the other.

The inventor wishes it to be understood that he does not desire to be limited to the exact details of construction shown and described, for obvious modifications will occur to a person skilled in the art.

What is claimed is:

1. A null adjustable vortex rate sensor comprising a chamber, a drain centrally located within said chamber, a pickoff secured to the base of said chamber and extending into said chamber at a distance away from said drain, and means for adjusting the position of a fluid stream stagnation point on said pickoff.

2. The null adjustable vortex rate sensor of claim 1 wherein said means for adjusting the position of the fluid stream stagnation point comprises means for adjusting the lateral position of said base.

3. The null adjustable vortex rate sensor of claim 2 wherein said pickoff has two pressure output ports.

* * * * *